Patented Sept. 28, 1943

2,330,571

UNITED STATES PATENT OFFICE 2,330,571

METHOD OF MAKING CHEWING GUM

Clarence H. Flint, Westport, Conn., assignor to Peter Paul, Inc., Naugatuck, Conn., a corporation of Delaware No Drawing. Application November 6, 1941, Serial No. 418,065

2 Claims. (Cl. 99—135)

My present invention relates to an improved chewing gum containing activated carbon and a method of making the same. In my previous Patent No. 2,138,804 of November 29, 1938, I have described and claimed an improved chewing gum containing activated carbon. I have now discovered that the properties of activated carbon may be utilized to produce an improved chewing gum in which the flavoring ingredient is more thoroughly incorporated in the gum base whereby the flavor of the gum is retained for a longer time than has heretofore been possible.

In the manufacture of chewing gum it is necessary to heat the gum base (i. e., chicle or other suitable gums or mixtures thereof) to a temperature considerably above body heat, e. g., 150° F. or above, in order to render the gum base sufficiently fluid so that the other ingredients may be incorporated in it. In so proceeding it has heretofore been the practice to add the flavoring ingredient at the very last and to stir it in for as little time as possible in order to minimize the time of contact of the flavoring ingredient with the hot mix, since at the temperatures at which the mix is fluid the volatile oils of the flavoring ingredient are in large part lost. Moreover, when the flavoring ingredient is added last, it is extremely difficult to thoroughly incorporate it in the gum base per se because of the presence of so great a quantity of the other ingredients, especially the powdered sugar; and as a practical result the flavoring matter leaves the gum base substantially as the sugar is dissolved in the operation of chewing, whereby the wad of gum quickly becomes flavorless.

I have now discovered that by first thoroughly mixing the flavoring ingredient with the activated carbon, the activated carbon-flavoring matter mixture may be added directly to the heated gum base (with which if desired may previously be mixed a syrupy sweetening agent, e. g., corn syrup), and thorough and homogeneous mixing of all the ingredients had. The reason that this is possible without the loss of a substantial amount of the flavoring material is that the activated carbon has the property of retaining the flavoring matters at temperatures as high as 160° F. and above. After the flavoring material has thus been incorporated into the gum base containing preferably the syrupy sweetening agent an additional sweetening agent in dry form, as for example powdered sugar, may be added, the mixing continued, and the batch removed from the kettle and made into sticks in the usual manner.

The following specific example is illustrative of my improved method:

20 pounds of corn syrup is put in the heated kettle; then 20 pounds of gum base is added at about 160° F. with constant stirring. Previously 1 pound of essential oil flavor, for instance oil of cassia, has been thoroughly mixed in a separate mixer with 2 pounds finely divided activated carbon, preferably that derived from lignin residues and sold under the trade name "Nuchar," although the invention is not limited to this source of activated carbon. Preferably the activated carbon is finely ground, i. e., one hundred mesh or finer. The activated carbon-flavoring mixture is now added to the kettle containing the hot liquefied gum base, and the mixing continued for five minutes or until the activated carbon-flavoring mixture is homogeneously incorporated into the mix. Then 60 pounds of powdered sugar is added and the mixing continued, after which the batch is "pulled," sheeted and cut into sticks in known manner.

The order of adding the ingredients may be varied somewhat, as for example, the corn syrup may be added after the addition of the flavoring matter-activated carbon mixture, although this increases somewhat the total time during which the flavoring matter is held at the elevated temperature. It will be understood that the invention may be embodied in many other examples as will be evident to those skilled in the art.

I claim:

1. The method of making chewing gum containing activated carbon, which comprises as a separate operation thoroughly incorporating flavoring material comprising essential oils with the activated carbon, preparing a gum base from which any substantial quantity of sugar in solid form is excluded and maintaining the same at a temperature substantially in excess of body heat and at which said essential oils are volatile whereby said gum base is fluid, adding to said gum base the above mentioned activated carbon-flavoring ingredient mixture, thoroughly incorporating same while maintaining the mixture fluid whereby said flavoring material is substantially homogeneously incorporated with said gum base, and then adding the sugar in solid form.

2. The method according to claim 1, in which a syrupy sweetening agent is mixed with the gum base prior to adding the flavoring matter.

CLARENCE H. FLINT.